(12) United States Patent
Schaefer

(10) Patent No.: US 8,784,964 B2
(45) Date of Patent: Jul. 22, 2014

(54) COMPOSITE PART AS WELL AS A METHOD FOR MANUFACTURING A COMPOSITE PART

(75) Inventor: Frank Schaefer, Steinweiler (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 237 days.

(21) Appl. No.: 13/232,726

(22) Filed: Sep. 14, 2011

(65) Prior Publication Data

US 2012/0100342 A1 Apr. 26, 2012

(30) Foreign Application Priority Data

Sep. 15, 2010 (DE) .......................... 10 2010 045 729

(51) Int. Cl.
*B60N 2/58* (2006.01)

(52) U.S. Cl.
CPC ............ *B60N 2/5816* (2013.01); *B60N 2/5883* (2013.01)
USPC ............................ 428/57; 428/62; 297/452.62

(58) Field of Classification Search
USPC .............. 428/57, 62, 99; 297/452.58, 452.59, 297/452.6, 452.61, DIG. 1
See application file for complete search history.

(56) References Cited

U.S. PATENT DOCUMENTS

2009/0096274 A1* 4/2009 Pedde et al. ............. 297/452.61

FOREIGN PATENT DOCUMENTS

| DE | 10120621 A1 | 11/2002 |
| DE | 102004003516 A1 | 8/2005 |
| DE | 102004029062 B3 | 9/2005 |
| DE | 102004053133 A1 | 5/2006 |
| WO | WO2010105855 A2 | 9/2010 |

* cited by examiner

*Primary Examiner* — Alexander Thomas
(74) *Attorney, Agent, or Firm* — Faegre Baker Daniels LLP

(57) ABSTRACT

A composite part includes a sub-material having a compression hardness of up to 50 kPa with a compression of 40% and a recess formed in the sub-material. A first skin and a second skin are connected at a seam that is disposed within the recess. A holding profile that includes a groove having side walls and a base and at least one wing is introduced into the recess.

18 Claims, 3 Drawing Sheets

US 8,784,964 B2

COMPOSITE PART AS WELL AS A METHOD FOR MANUFACTURING A COMPOSITE PART

CROSS-REFERENCE TO RELATED APPLICATION

The present application claims priority to German Application DE 10 2010 045 729.9, filed Sep. 15, 2010, which is incorporated herein by reference in its entirety.

TECHNICAL FIELD

The invention relates to a composite part as well as to a method for manufacturing such a composite part.

BACKGROUND

Composite parts of the known type are mainly applicable in the field of automobiles and in particular with inner trim parts, such as instrument panels, middle consoles, vehicle seats, arm rests, door inner trims or likewise.

Such composite parts are disclosed in the application PCT/EP2010/001890, which include a substrate, on which skins connected by a seam are positioned by way of a holding profile. The holding profile includes two wings which simplify an adjustment of the course of the seam on the substrate. Thus a simple deposition of two skins connected by seams is possible for different substrates, i.e. fixed substrates. However, relatively firm haptics result in the region of the holding profile with such composite parts.

SUMMARY

It is therefore an object of the invention to suggest a composite part, with which a course of a seam is positioned in a simple manner and which at the same time permits soft haptics.

The composite part according to the invention includes a first and a second skin, a holding profile and a sub-material. The sub-material according to the invention has a compression hardness of 50 kPa at the most with a compression of 40%. This means that at the most, a pressure of 50 kPa is necessary in order to compress the sub-material by 40%. This value of the compression hardness may for example be determined by testing methods according to ISO 3386/1. A recess is introduced into the sub-material, in which recess the holding profile is arranged. The holding profile has a groove which extends in a longitudinal direction and is delimited by two side walls as well as a base, and at least one first wing and in some embodiments has a second wing, wherein the first wing connects to the first side wall, and the second wing to the second side wall at the open end, i.e. the side of the groove which lies opposite the base. The wings thereby extend outwards away from the groove in a direction which is essentially orthogonal to the longitudinal direction as well as an opening direction.

Essentially, orthogonal is to be understood in that an angle between the longitudinal direction or the opening direction also indicated at the height direction and the wings is between 80 and 100°. In some embodiments, these wings each have a thickness (i.e. extension in the height direction) which is smaller than the depth of the groove. In a further embodiment, the wings have a thickness which is maximally 80%, 60%, 40% or 20% of the depth of the groove. The first and the second skin each project with an end section into the groove of the holding profile, wherein the two end sections of the skins are connected to one another by way of a seam arranged in the groove. Not only is a seam having a yarn to be seen as a seam, but also a connection of the two end sections of the skins by way of a bonding or a welding seam. The base of the groove in a further embodiment is designed in a mainly closed or continuously closed manner.

Soft haptics of the complete composite part result due to the use of a soft sub-material according to the invention. This, amongst other things, is advantageous with the use of the composite part for vehicle seats or arm rests. The fact that a positioning of skins on a soft sub-material by way of a holding profile possible in this manner was not to be expected by the man skilled in the art, since one was concerned that a softness of the sub-material reduces the positioning reliability of the holding profile in the recess.

In some embodiments, the sub-material is manufactured before introducing the holding profile. Thus no direct material-fit connection exists between the substrate and the holding profile. An indirect connection between the sub-material and the holding profile, for example by way of bonding the holding profile into the recess, may however be envisaged.

In further embodiments of the invention, a compression hardness with respect to a compression by 40% is 30 kPa, 20 kPa, 10 kPa or 5 kPa at the most. This results in particularly soft haptics, wherein a high positioning reliability is given despite this.

In a further embodiment of the invention, a foam layer is used as a sub-material. In some embodiments, the sub-material may be front foam, i.e. an injected foam, or from a cut foam. In some embodiments, the foam layer has a density of less than 500 kg/m$^3$. In some embodiments, the foam has a density of less than 200 kg/m$^3$. In some embodiments, the foam has a density of less than 150 kg/m$^3$. In some embodiments, the foam has a density that is less than, 100 kg/m$^3$, 80 kg/m$^3$ or 50 kg/m$^3$. Using a sub-material with such low density results in an advantageously low weight of the composite part. Moreover, a reduced quantity of plastic is used for the manufacture of the foam layer, reducing the production costs. Moreover, such a low density positively influences the haptics of the composite part.

In a further embodiment of the invention, an adhesive such as an adhesive layer is deposited between the sub-material and the skins. A particularly secure retention of the skins on the sub-material is made possible by way of this. In some embodiments, a particularly reliable connection results with the use of a foamed sub-material, since either a surface of the foam layer available for the connection is very large, or the adhesive may even penetrate partly into the sub-material, depending on the type of foamed sub-material. It is to be noted that a plurality of adhesive points may be sufficient instead of a continuous adhesive layer.

In a further embodiment, the sub-material is deposited with a lower side onto a substrate. The substrate may for example be polypropylene (PP), glass-fiber reinforced polypropylene (PPLGF), a wood fiber composite material or another natural fiber material.

If a front foam is used as a sub-material, this may be injected onto the substrate and thus be directly connected to this with a material fit. With the use of cut foam as a sub-material, this may for example be bonded onto the substrate. A particularly reliable connection hereby results if a continuous adhesive layer is used between the sub-material and the substrate, for bonding the sub-material onto the substrate.

In a further preferred embodiment of the invention, a pin connects to the side of the base which is away from the groove. In some embodiments, at least one anchor may connect to the pin. A secure positioning of the holding profile in the recess of the sub-material is achieved by way of the pin or anchor.

Different designs of recess are possible depending on the embodiment. It has been found to be particularly suitable to design the recess in the sub-material as a positioning groove with an elongate positioning groove trough. One shape of the positioning groove may thereby correspond to a shape of the holding profile. A particularly firm connection between the holding profile and the positioning groove is possible if the positioning groove trough is shaped as an undercut. What is meant here is that a width of the positioning groove trough on the base of this is larger than the width of the positioning groove at its upper edge. With such an embodiment, it is preferable for example if the pin and/or the anchor have a greater width than the positioning groove at the upper edge of this groove. If then the pin, as the case may be with the anchor, presses into the positioning groove, an rear engagement arises, which makes it difficult to pull out the holding profile in the direction of the open side of the groove. This thus arising connection may be indicated as a positive-fit connection, as a toothing, as a blocking or as a locking.

However embodiments are also possible, in which the positioning groove has a constant positioning groove width over the height. In these embodiments, the pin and/or the anchor are preferably designed in a manner such that a pressing between the anchor or pin and the positioning groove trough arises in the lateral direction. A pulling-out of the holding profile is then prevented by adhesive friction between the positioning groove trough and the anchor or pin. The thus arising connection may also be called a non-positive fit connection.

In a further embodiment of the invention, the composite part includes a bend-over region, in which a height of the holding profile is reduced, which reduces bending stiffness of the holding profile in the bend-over region is, by which means a positioning of the holding profile with the skins which are introduced here, is simplified in the positioning groove trough.

Advantages arise by way of the design with a bend-over region, in which the height of the holding profile is reduced, in particular in combination with the soft sub-material according to the invention, since a bending stiffness which is too large would lead to a restoring force arising when pressing the holding profile into the positioning groove. This would deform a recess introduced into a soft sub-material or press the holding profile out of the recess, by which means an increased effort would be necessary, in order to prevent the holding profile from slipping out of the positioning groove when positioning.

In a further embodiment of the invention, the height of the holding profile in the bend-over region is reduced by way of either the pin in the bend-over region having a reduced length or no pin being arranged in the bend-over region. In this manner, a height of the holding profile may be reduced in a simple manner For example, firstly a holding profile with a height which is constant over the length may be manufactured, wherein the pin is shortened or separated off in the bend-over region or in the bend-over regions. One or more anchors may be removed when shortening or separating off the pin.

The bend-over region may be arranged in an edge region of the profile, i.e. at one end of the profile seen in the longitudinal direction of the profile, depending on the design of the composite part. It is just as well possible for the bend-over region to be arranged in a middle region of the profile. Moreover, it is possible for several bend-over regions to be provided. The length of the bend-over region or bend-over regions may for example in each case lie between 10 mm and 40 mm, between 15 mm and 30 mm or between 20 mm and 25 mm. A residual height of the holding profile in the bend-over region may for example lie between 1.5 mm and 3 mm, between 1.8 mm and 2.7 mm or between 2.1 mm and 2.4 mm In some embodiments, the holding profile is an extruded plastic and has a Shore hardness (such as Shore A hardness) between 25 and 100. In some embodiments, the holding profile has a Shore hardness between 40 and 70. A holding profile manufactured of a corresponding plastic has the necessary softness for creating complicated curved seam courses. Moreover, it is possible to manufacture infinitely long holding profiles by way of the extrusion method, wherein the longitudinal direction of the holding profile or of the groove corresponds essentially to the extrusion direction.

In a further embodiment of a composite part, the holding profile extends over the whole length of the seam connecting the skins. By way of this, a seam course may be reliably positioned over the whole length and a later deposition of the skins onto a substrate is simplified, since a course of the seam is completely defined by the profile extending over the whole length. In some embodiments, the holding profile has the same length as the seam connecting the skins. In further embodiments, the holding profile is longer than the skin connecting the skins. Independently of whether the holding profile is longer or equally long as the seam, in some embodiments at least a 10 mm to 40 mm, 15 mm to 30 mm or 20 mm to 25 mm long coherent section of the seam connecting the skins is arranged in the bend-over region of the holding profile.

In a further embodiment of the invention, the holding profile is bent over in at least one bend-over by at least 30°, at least 45°, at least 60° or at least 80°. In a further embodiment, the holding profile, in the bend-over region or in each of the bend-over regions, is bent over by about 180° at the most. In a further embodiment, a bending radius of the holding profile measured at the lower side of the base of the holding profile, in at least one bend-over region, is less than 20 mm, 10 mm or 5 mm.

Additionally or alternatively to the bending of the holding profile in the height direction, the holding profile, at least in regions, may be arranged tilted with respect to the opening direction of the recess. What is meant with this is that the holding profile, with respect to an installed position, in which the side walls of the groove (i.e. the opening direction of the groove) run parallel to the opening direction of the recess (also called mould removal direction), is tilted about an axis running in the longitudinal direction. A maximal tilting angle may for example be smaller than 30° and in some embodiments be between 1° and 12°.

In some embodiments, the recess at an end lying in the bend-over region may run out in a notch of the sub-material and/or substrate, wherein the base of the holding profile in the bend-over region projects into the notch region. This notch may for example also be arranged partly in the sub-material and be led further into the substrate.

In a further embodiment of the invention, the holding profile runs around the composite part. For example, the composite part may be designed as an arm rest, wherein this includes a peripheral seam arranged in the holding profile. For example, in this embodiment, the holding profile includes several bend-over regions which are offset to one another in the longitudinal direction of the holding profile. In some embodiments, the holding profile between the bend-over regions has the whole height, i.e. a pin is not shortened between the bend-over regions.

Moreover, the invention includes a method for manufacturing a composite part. Before the method, a sub-material with a recess is produced, whereby a compression hardness of the sub-material which at the most is 50 kPa with respect to a compression by 40%. Moreover, a holding profile with a groove which is delimited by side walls and a base and extends in a longitudinal direction is created. Moreover, the first skin and the second skin are produced. These may for example consist of leather or of an artificial leather and/or a slush skin. The exact sequence of the manufacture of these components in this context is insignificant. With the method, an end-section of the first skin is connected to an end section of the second skin by way of a seam. The seam may thereby be designed as a seam having a yarn. Likewise however, a bonding connection between the end sections is possible.

The end section of the first skin and the end section of the second skin are moreover introduced into the groove of the holding profile. This may be effected either before the connection of the end sections to one another or thereafter. If the end sections are introduced into the groove before the end sections are connected to one another, the end sections may be connected by a seam which goes through the side walls of the holding profile and simultaneously also connects the holding profile to the end sections. This seam may be produced by way of sewing through the side walls. Likewise, it is also possible to design the seam as a weld seam. For this, a heated gas (air for example) may be led to the connection location of the end sections, so that these melt with one another. The holding profile is introduced into the recess of the sub-material after the end sections are connected to one another and introduced into the groove.

In a further embodiment of the invention, the sub-material is connected to a substrate before the holding profile is introduced into the recess of the sub-material. The connection of the sub-material and the substrate may either be effected on producing the sub-material, for example by foaming or integrally forming the sub-material onto the substrate, or after the production of the sub-material, for example by bonding the sub-material onto the substrate. If a connection of the sub-material and the substrate is effected by way of foaming-on the sub-material, prior to this, the substrate is inserted into a foam mold, wherein the foam mold is subsequently closed, so that a foaming cavity arises. Then a plastic material which is suitable for foaming, for example a two-component foam, is introduced into this. In some embodiments, a foaming procedure is initiated before heating the foaming mold. Preferably, the foaming mold may contain a projection which corresponds to the shape of a recess to be produced in the sub-material.

Further details of the holding profile and of the composite part, in particular with respect to the first skin, the second skin, the wings (including a possible formation with teeth or with slots), the side walls, the base, the groove, the substrate groove (wherein this, in the framework of this invention, is arranged in the sub-material instead of in the substrate and is indicated as a positioning groove), the pin, the design and arrangement of the anchor(s), of the seam/seams, of the end sections, of the connection of the holding profile to the recess, of the materials from which the holding profile and the first and second skin as well as the substrate consist, may be deduced from the already mentioned document with the international application number PCT/EP 2010/001890, which in this context is declared as an integral part of the disclosure of the present application. Likewise, further details of the method for manufacturing a composite part, in particular with regard to the connection of the first and second skin or their end sections to one another or to the holding profile or to the wings of the holding profile, may be likewise deduced from this document. The mentioned document is to be part of the contents of disclosure of the present application, also in the framework of these mentioned features.

The at least one wing of the holding profile amongst other things serves for the connection between a part section of the first or second skin which connects to the end section, to a first or second of the at least one wing of the holding profile, by way of a first and second seam respectively. With this, the first and second seam comprises at least one yarn. This means in particular that the connection between the end section of the first or second skin and the first or second wing is such that at least one yarn engages at least in sections behind the first or second wing, seen from a viewed side of the first or second skin. With regard to the first and second skin, it is preferably the case of deco-seams or decorative seams.

The presence of two wings, amongst other things is necessary if a first or second seam is to be introduced on both sides of the connection location of the first and second skin.

Since the end sections of the first and second skin are in each case guided or held in the groove, only one layer of the first and second skin needs to be sewn to the first and second wing respectively. This reduces the quantity of the material of the first and second skin which is to be used. Moreover, the force to be applied for introducing the seam is reduced, since it is only one layer of the first or second skin which needs to be pierced.

No prior gluing (bonding) between the holding profile and the first or second skin is needed. The co-sewing of a seam strip, as is necessary in previous methods, may also be done away with. On account of the depth and the width of the groove, the first or second skin may for example be held in the groove in a slightly clamped or loose manner. By way of this, it is possible to influence the shape or the optics of the connection location between the first and second skin, which is visible from the viewed side of the first and second skin.

The wings permit an exact positioning of the holding profile in a recess of a substrate and serve as spacers or position holders. An exact dimension of the depth and width of the recess is no longer necessary due to the wings, since the wings are supported on an oppositely lying flange which is attached on a side wall of the groove, in an equalizing manner on the surface of the substrate which is located next to the recess and delimits this.

Since the wings have a material thickness or wing thickness which is less than the depth of the groove and lies in the region of less than 1.5 mm or less than 1 mm, the slight projection of the holding profile out of the surface of the substrate which is caused by the wings, is not significant. Thus an exact positioning of the course of the seam or groove which is simple to obtain and in not evident in its appearance, may be achieved with the help of the wings. The wing or wings are essentially not recognizable as a projection, in particular if a first and a second skin are arranged in the holding profile and cover the wing on the viewed side. Thus an essentially plane ending is effected between a viewed-side substrate surface and the holding profile arranged in a recess of the substrate, without extensive adjustment.

A time-saving of between 20% and 80% with respect to conventional methods for manufacturing a composite part according to the state of the art may be achieved with the help of the profile according to the invention and the composite part according to the invention.

An independent part of the invention relates to composite parts, with which a welding connection or welding seam of the skins is envisaged instead of a connection of the skins by way of a seam arranged in the groove. A design with a welding connection instead of a seam having a yarn may be considered as being advantageous with all composite parts disclosed in this application. Likewise, the independent part of the invention relates to any composite parts disclosed by PCT/EP 2010/001890, wherein a welding connection is each provided instead of the seam arranged in the groove.

This independent part of the invention therefore relates to a composite part with the first skin, a second skin and a holding profile, wherein the holding profile comprises a groove extending in a first direction. The first and second skin is hereby connected by way of a welding seam. An end section of the first skin, an end section of the second skin and the welding seam are thereby arranged in the groove. The holding profile furthermore comprises at least one, preferably two wings.

In a method according to the independent part of the invention, the composite part is manufactured as is defined in one of the claims 4 to 11 of PCT/EP 2010/001890, wherein the seam arranged in the groove is designed as a welding seam. In some embodiments, the welding seam may be manufactured by a hot-air welding process. For this, the end sections of the first and second skin may be arranged in the groove of the holding profile and subsequently heated by way of hot air, so that a bonding (frictional) connection is produced by way of bonding the end sections to one another. A sewing guide for positioning the skins in the groove is not necessary on account of this.

BRIEF DESCRIPTION OF THE FIGURES

Embodiment examples of the invention are hereinafter explained in more detail by way of the figures. There are shown in.

DETAILED DESCRIPTION

Figure 1:
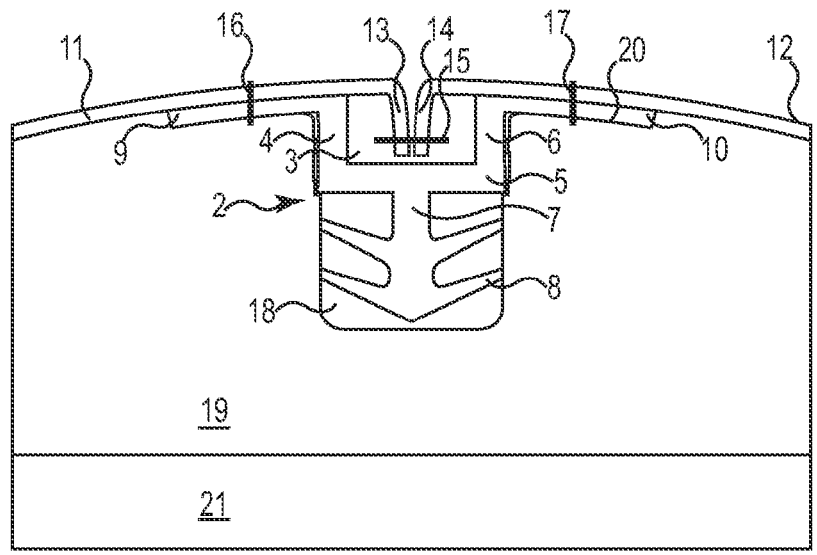
FIG. 1 is a sectioned view through a first preferred embodiment of a composite part.

FIG. 1 shows a first advantageous embodiment of a composite part 1. The composite part includes a holding profile 2, two skins 11, 12 positioned by the holding profile, a sub-material 19 and in some embodiments includes a substrate 21. The sub-material 19 which is designed as a cut foam layer with a compression hardness of about 4 kPa with respect to a compression of 40% and with a density of about 45 kg/m$^3$, includes a recess 18, into which the holding profile 2 is introduced. The cut foam may for example be provided as a rolled product and in some embodiments has a tensile strength of more than 100 kPa or more than 140 kPa and an elongation at break of more than 150% or more than 170%. The tensile strength and the elongation at break may for example be determined by a testing method according to ISO 1798. The cut foam may be laminated on one or both sides with a plastic film, for example a polyurethane film. In some embodiments, the polyurethane film has a tear strength of at least 10, 20, 30 or 35 MPa. In some embodiments, a tear strength of the film may be anisotropic, i.e. dependent on direction and/or be between 40 and 50 MPa in a longitudinal direction of the film and between 35 and 45 MPa in a transverse direction. The tear strength may for example be determined as specified by the standard ISO 527-3/2/200. In some embodiments, a further tear strength is at least 50 N/mm or at least 80 N/mm in the longitudinal direction of the film, and at least 20 N/mm or between 40 and 50 N/mm in the transverse direction. The further tear strength may for example be determined as specified by the standard ISO 53515/90. A longitudinal direction of the film may thereby be different to a longitudinal direction of the holding profile or also be identical to this. Likewise, the longitudinal direction of the film may be essentially orthogonal to a longitudinal direction of the holding profile, in order to prevent a tear formation outwards from the positioning groove, in a particularly efficient manner. In some embodiments, a maximal extensibility of the film is at least 50%. In an alternative embodiment, a film may be provided merely for the protection of the cut foam from contamination before the use as a sub-material. In such embodiments, the film may be removed from the cut foam before depositing the sub-material onto the substrate. In some embodiments, a thickness of the sub-material is at least 8 mm. The lower side of the sub-material 19 is bonded onto the substrate 21 which may be designed for example as a plastic substrate reinforced with wood fiber and/or glass fiber.

The holding profile 2 which is arranged in the recess 18 includes a groove 3 which extends in the longitudinal direction (the direction orthogonal to the picture plane) of the holding profile 2 and which is delimited by a first side-wall 4, a base 5 and a second side-wall 6. A pin 7 connects to the lower side of the base 5. The pin 7 is equipped with one or more anchors 8 which produce a particularly firm retention of the holding profile 2 in the recess 18.

End-sections 13, 14 of the two skins 11, 12 are arranged in the groove 3. The end-sections 13, 14 there are connected by way of a first seam 15 which for example includes a yarn. A glued connection or welding connection would also be possible instead of a seam 15. A welding connection may for example be manufactured in a manner such that firstly the end-sections 13, 14 of the skins 11, 12 are arranged in the groove 3 and subsequently heated by way of hot air and welded to one another.

Additionally to the connection of the skins 11, 12 to one another by way of the seam 15, the first skin 11 is connected to the first wing 9 by way of a second seam 16, and the second skin 12 to a second wing 10 by way of a third seam 17. The seams 16, 17 may thereby preferably be designed as decorative seams (also called deco-seams) and the seam 15 may be designed as a functional seam. With this, the wings 9, 10 are a constituent of the holding profile 2 and connect to the upper edges of the side walls 4, 6 in a manner running outwards away from the groove. A positioning of a course of the seam 15 is simplified by way of the wings 9, 10. Rest regions 20 which are arranged set back with respect to a surrounding surface of the sub-material 19, are provided, in order to permit a flush termination of the wings 9, 10 with the upper edge of the sub-material 19. Moreover, a positioning of the course of the seam 15 is further simplified by the rest regions 20, since when pressing the holding profile 2 in the groove 3, an automatic centering of the holding profile in the groove 3 is achieved.

Figure 2:
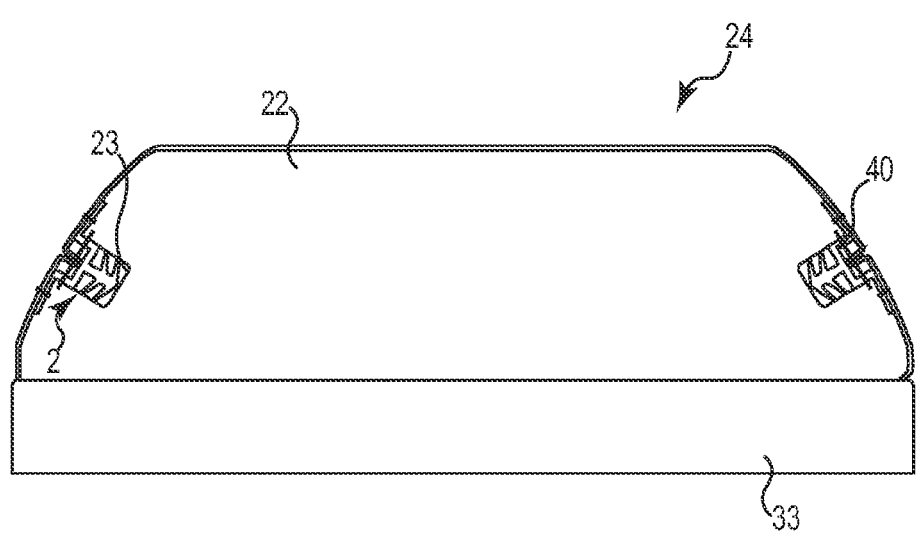
FIG. 2 is a sectioned view through a second advantageous embodiment of a composite part.

A sectioned view of a second advantageous embodiment of a composite part is represented in FIG. 2. This composite part is designed as an arm rest 24 with a seam 40 running around a cushion material 22. The seam 40 in this embodiment not only connects the end-section 13 of the first skin 11 to the end section 14 of the second skin 12, but also connects the end-sections to the holding profile 2. For this, the seam 40 was introduced through the side walls 4, 6 of the holding profile 2, so that the side walls 4, 6 are sewn to the end sections 13, 14. The cushion material 22 has a peripheral groove 23, in which the holding profile 2 is arranged. The cushion material 22 is designed as a front foam, for example with a density of about 170 kg/m$^3$ and is integrally formed onto a substrate 33 by way of foaming on and is thus connected to this with a material fit.

Figure 3:
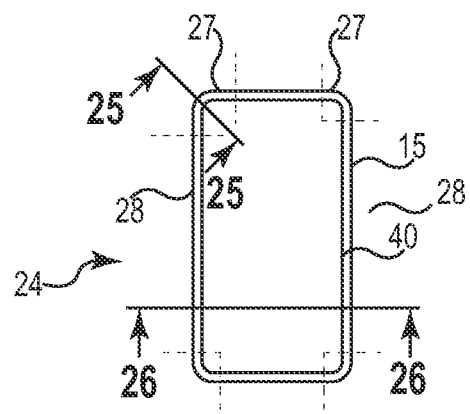
FIG. 3 is a plan view of the composite part of FIG. 2.
Figure 3A:
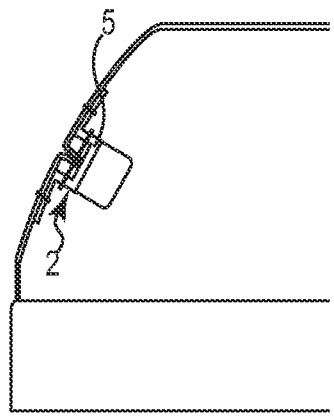
FIG. 3a is a sectioned view through the composite part of FIGS. 2 and 3 in a bend-over region.

The arm rest of FIG. 2 is represented in FIG. 3 in a plan view. As may be recognized there, the seam 40 runs in the sections 28 in a straight line, the seam 40 runs in a curved manner in the bend-over regions 27. The holding profile 2 is bent in the height direction, i.e. in a direction which is essentially orthogonal to the longitudinal direction and to the direction of the wings 9, 10, due to the arcuate course of the seam 40. The sectioned view from FIG. 2 thereby represents a section along the section line 25 through a section 28, in which the holding profile 2 runs in a straight line. In contrast, a section along the section line 25 through a bend-over region 27 of the arm rest 24 is represented in FIG. 3a. As may be recognized, the holding profile 2 in the bend-over region 27 has no pin 7 connecting to the base 5. A height of the holding profile 2 (here the vertical extension of the holding profile 2 in FIG. 1 is indicated as the height) is reduced in the bend-over region by way of this, by which means a bending stiffness is likewise reduced.

Figure 3B:
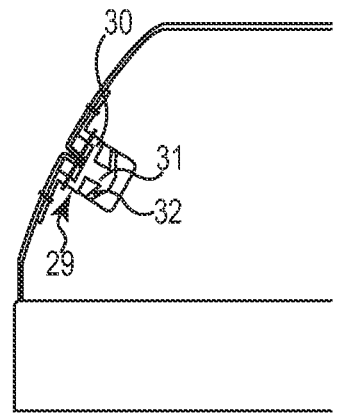
FIG. 3b is a sectioned view through a bend-over region of the composite part according to an alternative preferred embodiment.

A section along the line 25 through the bend-over region 27 according to an alternative embodiment of an arm rest is represented in FIG. 3b. In the region of the section line 25, the holding profile 29 includes a shortened pin 31 with an anchor 32, said pin connecting to the base 30 of the holding profile. Thus only a part of the pin 7 has been separated away in the bend-over region, so that on the one hand a bending stiffness of the holding profile 29 has been reduced and on the other hand an anchor 32 remains for improving the connection between the holding profile 29 and the cushion material 22.

Figure 4A:
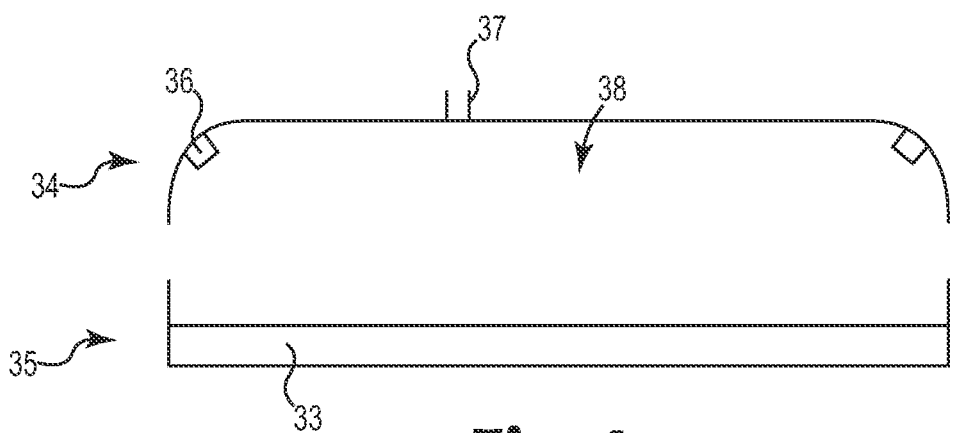
FIGS. 4a and 4b are representations of steps of a method for manufacture of the composite part of FIG. 2.
Figure 4B:
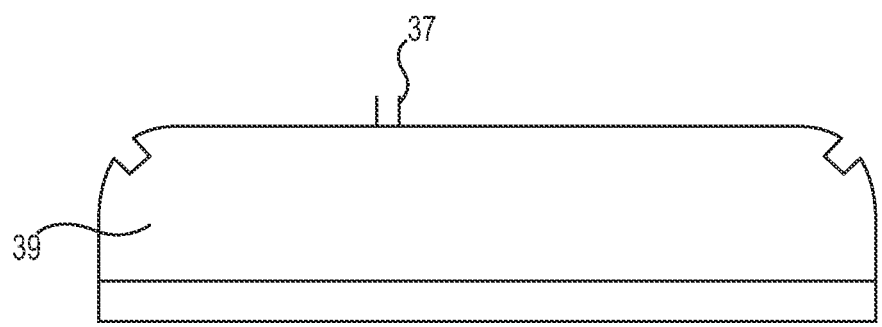

Method steps for manufacturing an arm rest 24 of FIG. 2 are represented in FIGS. 4a and 4b. A molding tool including an upper tool half 34 and a lower tool half 35 is represented in FIG. 4a. The substrate 33 is arranged in the lower tool half 35. The upper tool half which has a projection 36 corresponding to the shape of the recess 23 and projecting into the cavity 39, is placed onto the lower mold half 35 in the direction 38. Subsequently, a foamable material is introduced through an inlet valve 37. Alternatively, a foamable material may also be introduced before the closure of the mold, wherein a foaming procedure is initiated only after the closure of the mold. The starting of the foaming procedure may be activated for example by way of an increase of the temperature of the molding tool. A cavity 39, which is arranged above the substrate, is filled out with the cushion material 22 by way of the foaming procedure. An adhesive is subsequently deposited onto the thus produced cushion material 22. Subsequently, the holding profile 2 into which the skins 11, 12 were previously already introduced, is positioned into the recess 23 of the cushion material 22. With this, the skins are pressed onto the cushion material 22 and connected to this by way of the adhesive. The arm rest 24 is completed as is shown in FIG. 2, by way of this.

Even if composite parts according to the invention have been described previously be way of the example of an arm rest, the invention also relates to other analogously designed vehicle inner trim parts such as dashboards, door inner trims or seats.

The invention claimed is:

1. A composite part comprising:
   a sub-material;
   a recess formed in the sub-material;
   a first skin having an end section;
   a second skin having an end section;
   a first seam connecting the first skin and the second skin; and
   a holding profile introduced into the recess, the holding profile including a groove having side walls and a base and extending in a first direction, a first wing and a second wing;
   wherein the end section of the first skin, the end section of the second skin and the seam are arranged in the groove;
   wherein the recess is configured such that the at least one wing lies on a surface of the sub-material outside of the recess; and
   wherein the first skin is connected to the first wing by way of a second seam and the second skin is connected to a second wing by way of a third seam.

2. The composite part of claim 1, wherein the first, second and third seams comprise at least one yarn.

3. The composite part of claim 1, wherein the sub-material comprises a foam layer having a density of less than 500 kg/m$^3$.

4. The composite part of claim 1, wherein the sub-material comprises a foam layer having a density of less than 250 kg/m$^3$.

5. The composite part of claim 1, wherein the sub-material comprises a foam layer having a density of less than 180 kg/m$^3$.

6. The composite part of claim 1, further comprising an adhesive arranged between the sub-material and one of a rear side of the first skin and a rear side of the second skin, the rear side being directed towards the sub-material.

7. The composite part of claim 1, further comprising a substrate, with the sub-material disposed with a lower side thereof onto the substrate.

8. The composite part of claim 1, wherein the holding profile further comprises a pin that connects to a side of the base that is away from the groove.

9. The composite part of claim 8, wherein the pin comprises at least one anchor.

10. A composite part comprising:
    a sub-material;
    a recess formed in the sub-material;
    a first skin having an end section;
    a second skin having an end section;
    a seam connecting the first skin and the second skin;
    a holding profile introduced into the recess, the holding profile including a groove having side walls and a base and extending in a first direction, and at least one wing;
    a bend-over region in which a height of the holding profile in a direction orthogonal to the wing is reduced compared to a height of the holding profile in a region outside of the bend-over region;
    wherein the end section of the first skin, the end section of the second skin and the seam are arranged in the groove.

11. The composite part of claim 10, wherein the height of the holding profile in the bend-over region is reduced by a pin having a reduced length in the bend-over region.

12. The composite part of claim 10, wherein the height of the holding profile in the bend-over region is reduced by not having the pin arranged in the bend-over region.

13. A composite part comprising:
    a sub-material having a compression hardness of up to 50 kPa with a compression of 40%;
    a recess formed in the sub-material;
    a first skin having an end section;
    a second skin having an end section;

a first seam connecting the first skin and the second skin; and a holding profile introduced into the recess, the holding profile including a groove having side walls and a base and extending in a first direction, and a first wing and a second wing;

wherein the end section of the first skin, the end section of the second skin and the seam are arranged in the groove, and wherein the recess is configured such that the at least one wing lies on a surface of the sub-material outside of the recess; and wherein the first skin is connected to the first wing by way of a second seam and the second skin is connected to the second wing by way of a third seam.

14. The composite part of claim 13, wherein the sub-material comprises a foam layer having a density of less than 500 kg/m$^3$.

15. The composite part of claim 13, further comprising an adhesive arranged between the sub-material and a rear side of the first skin or the second skin, the rear side being directed towards the sub-material.

16. The composite part of claim 13, further comprising a substrate, with the sub-material disposed with a lower side thereof onto the substrate.

17. The composite part of claim 13, wherein the holding profile further comprises a pin that connects to a side of the base that is away from the groove.

18. The composite part of claim 17, wherein the pin comprises at least one anchor.

* * * * *